United States Patent
Okazaki et al.

(10) Patent No.: US 9,764,903 B2
(45) Date of Patent: Sep. 19, 2017

(54) TRANSPORT DEVICE

(71) Applicants: NAKANISHI METAL WORKS CO., LTD., Osaka-shi (JP); HONDA MOTOR CO., LTD., Tokyo (JP)

(72) Inventors: Yoshihiro Okazaki, Osaka (JP); Toshiyuki Uchibori, Osaka (JP); Takahisa Kobayashi, Tokyo (JP)

(73) Assignees: NAKANISHI METAL WORKS CO., LTD., Osaka-shi (JP); HONDA MOTOR CO., LTD., Tokyo (JP)

( * ) Notice: Subject to any disclaimer, the term of this patent is extended or adjusted under 35 U.S.C. 154(b) by 69 days.

(21) Appl. No.: 14/903,407

(22) PCT Filed: Jun. 30, 2014

(86) PCT No.: PCT/JP2014/067394
§ 371 (c)(1),
(2) Date: Jan. 7, 2016

(87) PCT Pub. No.: WO2015/005164
PCT Pub. Date: Jan. 15, 2015

(65) Prior Publication Data
US 2016/0159577 A1    Jun. 9, 2016

(30) Foreign Application Priority Data

Jul. 10, 2013   (JP) ................... 2013-144510

(51) Int. Cl.
*B65G 51/01*    (2006.01)
*B65G 35/08*    (2006.01)
(Continued)

(52) U.S. Cl.
CPC .............. *B65G 35/08* (2013.01); *B61F 9/00* (2013.01); *B65G 17/22* (2013.01); *B65G 17/34* (2013.01);
(Continued)

(58) Field of Classification Search
CPC ........ B65G 51/01; B65G 35/08; B65G 15/60; A63G 3/02; B61B 13/08
(Continued)

(56) References Cited

U.S. PATENT DOCUMENTS 3,119,349 A * 1/1964 Hampton et al. ........ B60V 3/04
                                                          104/124
3,399,758 A * 9/1968 Karr ....................... B65G 23/20
                                                           104/20
(Continued)

FOREIGN PATENT DOCUMENTS

CN        2936864 Y      8/2007
CN      201148289 Y     11/2008
(Continued)

OTHER PUBLICATIONS

First office action dated Dec. 7, 2016 for corresponding Chinese Patent Application No. 201480037954.8.
(Continued)

*Primary Examiner* — Joseph Dillon, Jr.
(74) *Attorney, Agent, or Firm* — Kratz, Quintos & Hanson, LLP

(57) ABSTRACT

An object of the present invention is to suppress rise in running resistance with increases in weight of a transport vehicle group, and prevent higher energy consumption and manufacturing cost. A transport device transports a transport vehicle (1) carrying an article (E) along a transport path including a curved path and forms a continuous floor (B) on the transport vehicle (1) in the entire or partial transport path. The transport device includes: running rails (R) that are laid along the transport path to support running wheels (4, 5, and 6) of the transport vehicle (1); guide rails that guide the transport vehicle (1) along the transport path; a drive unit
(Continued)

that drives the transport vehicle (1); and a water way (WW) that is formed along the transport path to reserve water (W).

9 Claims, 12 Drawing Sheets

(51) Int. Cl.
*B65G 35/06* (2006.01)
*B61F 9/00* (2006.01)
*B65G 17/22* (2006.01)
*B65G 17/34* (2006.01)

(52) U.S. Cl.
CPC ............. *B65G 35/06* (2013.01); *B65G 51/01* (2013.01); *B65G 2201/0294* (2013.01)

(58) Field of Classification Search
USPC .......... 406/51, 81, 106, 192; 104/23.1, 23.2; 198/465.2, 465.3, 707, 781.04, 781.08, 198/799, 811
See application file for complete search history.

(56) References Cited

U.S. PATENT DOCUMENTS

| | | | | |
|---|---|---|---|---|
| 3,662,906 A * | 5/1972 | Christensen | ............ | B61B 1/005 104/172.2 |
| 3,807,806 A * | 4/1974 | Takahashi | ............. | E02B 5/06 104/154 |
| 4,198,902 A * | 4/1980 | Worden | ................ | A01J 25/167 134/125 |
| 4,455,945 A * | 6/1984 | Swensson | ................ | B60V 3/04 104/134 |
| 4,739,710 A | 4/1988 | Imamura | | |
| 4,742,778 A * | 5/1988 | Morishita | ............... | B61B 13/08 104/284 |
| 5,465,827 A * | 11/1995 | Nakagawa | ............. | B65G 35/06 104/168 |
| 5,873,452 A * | 2/1999 | Nolan | ................... | B65G 17/002 198/465.3 |
| 5,922,230 A * | 7/1999 | Yokota | ................... | B23K 1/008 198/465.3 |
| 6,047,813 A * | 4/2000 | Herzog | ................ | B65G 17/002 198/465.3 |
| 6,267,124 B1 * | 7/2001 | Bowden | ................. | B08B 3/041 134/111 |
| 6,372,107 B1 * | 4/2002 | Besinger | ................... | B05C 3/10 204/479 |
| 6,494,142 B2 * | 12/2002 | Masugaki | ............. | B65G 35/06 104/168 |
| 6,749,055 B2 * | 6/2004 | Takano | ................ | B61B 13/127 104/168 |
| 6,889,816 B2 * | 5/2005 | Willing | ................ | B23Q 7/1431 198/465.2 |
| 6,966,430 B2 * | 11/2005 | Swinderman | .......... | B65G 15/60 198/811 |
| 7,168,556 B2 * | 1/2007 | Spoeler | ................... | B62D 65/18 198/465.2 |
| 7,303,060 B1 | 12/2007 | Chen | | |
| 7,658,273 B2 * | 2/2010 | Nakamura | ............. | B65G 17/48 104/34 |
| 7,891,482 B2 * | 2/2011 | Takahashi | ............. | B23P 21/004 198/581 |
| 8,276,744 B2 * | 10/2012 | Bacalia | ................. | F16H 19/025 198/617 |
| 8,540,235 B2 * | 9/2013 | Kern | ...................... | B65H 1/025 198/465.3 |
| 8,544,633 B2 * | 10/2013 | Stevenson | ............. | B65G 19/04 198/704 |
| 2002/0063020 A1 * | 5/2002 | Shin | ........................ | B63B 21/18 186/49 |
| 2003/0079967 A1 * | 5/2003 | Nishihara | ............. | B61B 13/127 198/838 |
| 2006/0096835 A1 * | 5/2006 | Bellezza | ................ | B62D 65/18 198/345.3 |
| 2007/0283839 A1 * | 12/2007 | Bartlett | ................... | B61B 13/12 104/165 |
| 2007/0284221 A1 * | 12/2007 | Chen | ...................... | B65G 51/01 198/501 |
| 2008/0135382 A1 * | 6/2008 | Nakamura | ............. | B61B 10/02 198/463.2 |
| 2008/0173500 A1 * | 7/2008 | Shimizu | ................. | B65G 35/08 187/224 |
| 2009/0090598 A1 * | 4/2009 | Nakamura | ............. | B65G 17/48 198/345.1 |
| 2013/0025491 A1 * | 1/2013 | Crawford | ............... | A63G 21/18 104/28 |
| 2014/0102854 A1 * | 4/2014 | Ecob | ...................... | B65G 35/06 198/465.2 |
| 2015/0306507 A1 * | 10/2015 | Burger | ..................... | A63G 3/02 472/128 |

FOREIGN PATENT DOCUMENTS

| | | |
|---|---|---|
| JP | S63-102238 | 5/1988 |
| JP | H08-282481 | 10/1996 |
| JP | H09-88363 | 3/1997 |
| JP | 2006-117079 A1 | 5/2006 |
| JP | 2007-112605 A1 | 5/2007 |
| JP | 2013-107731 A1 | 6/2013 |

OTHER PUBLICATIONS

International Search Report for International Application No. PCT/JP2014/067394 dated Aug. 26, 2014 (1 Sheet).

* cited by examiner

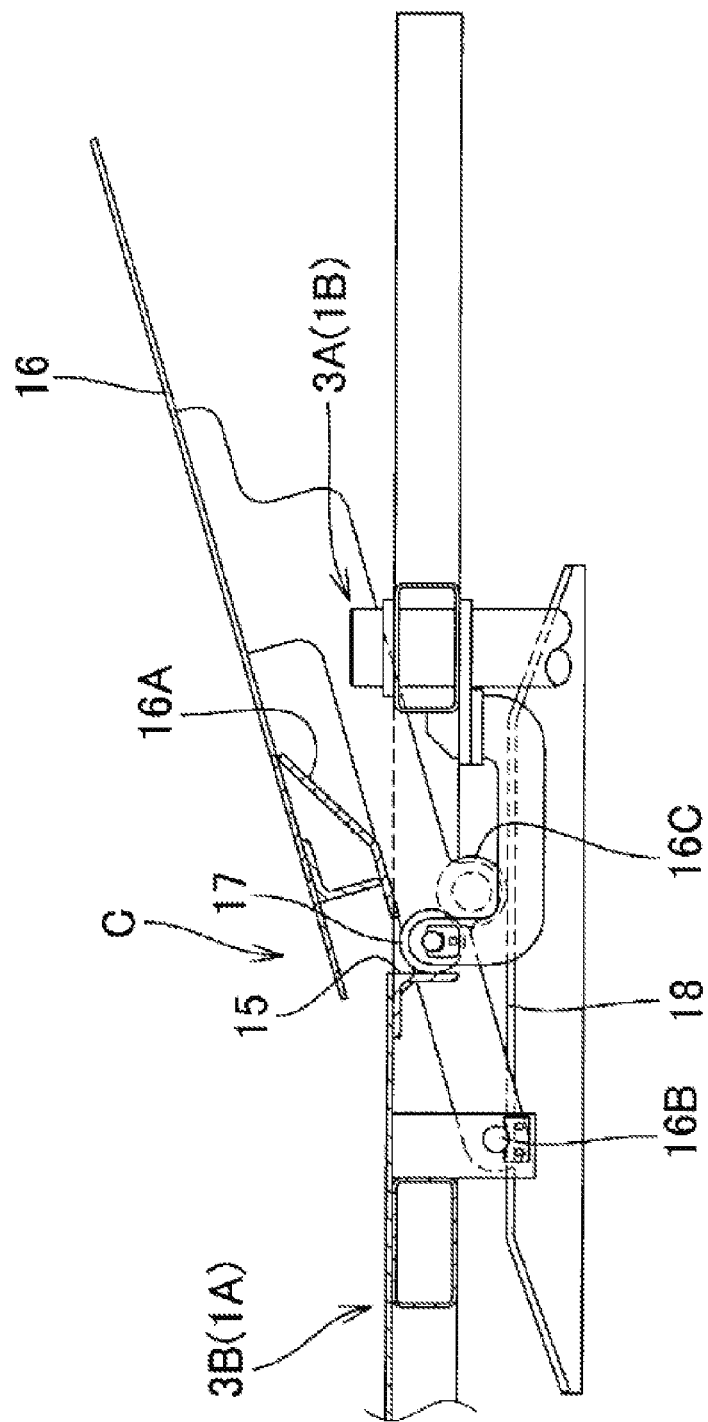
[Fig. 12]

TRANSPORT DEVICE

TECHNICAL FIELD

The present invention relates to a transport device that transports non-self-propelled transport vehicles carrying articles along a transport path including a curved path and forms a continuous floor on the transport vehicles in the entire or partial transport path.

BACKGROUND ART

According to one transport device that can form a continuous work floor (work plane) on which a worker rides to perform work while transporting transport vehicles carrying articles along a transport path, front and back transport vehicles (1 and 1) are coupled together by vehicle coupling units (vehicle coupling means (9), coupling start means (10), and decoupling means (11)) and are transported at a constant speed by a pushing drive means (5A) in a straight work line (pushing run section (3)) where the ends of the transport vehicles (1) are in abutment with each other to form a continuous work floor, and the transport vehicle (1) having exited out of the work line is decoupled and transported at a higher speed by a high-speed drive means (5C) in a return line (high speed run section (4)) for returning the transport vehicle (1) having exited out of the work line to the entrance of the work line (for example, refer to Patent Document 1).

According to another transport device, the transport vehicles (movable bodies (10)) are coupled together by a coupling unit (30) at the front and back parts opposed to each other so as to be capable of relative rotation in the lateral direction, a train-like endless continuous body (90) is formed from a transport vehicle group (moving body (10) group) and a coupling unit (30) group, and the endless continuous body (90) is driven by a feed unit (50) (for example, refer to Patent Document 2).

According to still another transport device, transport vehicles (pallets (2)) are divided into a plurality of sections relative to the transport direction, the divided transport vehicles (divided pallets (2A, 2B, and 2C)) are movably coupled together in a horizontal plane, and the transport vehicles are transported in a free flow system in which, when the following transport vehicle abuts with the preceding transport vehicle, the following transport vehicle pushes the preceding transport vehicle (for example, refer to Patent Document 3).

According to still another transport device, each of the transport vehicles (1) is composed of one or more vehicle bodies (1A and 1B) and coupled vehicle bodies (2A and 2B) that are positioned at the front or back side of the vehicle bodies (1A and 1B) in the transport direction and are coupled to the vehicle bodies (1A and 1B) so as to be capable of relative rotation around a vertical axis, the upper surfaces of the vehicle bodies (1A and 1B) and the upper surfaces of the coupled vehicle bodies (2A and 2B) are flush with each other, a coupling means (C) is provided to couple the transport vehicles (1 and 1) positioned at the front and back sides in the transport direction, the plurality of transport vehicles (1, 1, . . . ) is coupled by the coupling means (C) and is arranged as a transport vehicle group (A) in a transport path including a curved path (C1), a work line (L1) for performing parts assembly work while transporting the transport vehicle group (A) at a constant speed is formed with a work floor (B) composed of the upper surfaces of the vehicle bodies (1A and 1B) and the coupled vehicle bodies (2A and 2B), a return line (L2) is provided such that the transport vehicle (1) at the front end of the transport vehicle group (A) in the transport direction is separated and transported at a high speed and is coupled to the back end of the transport vehicle group (A), and an article (W) is unloaded from the single transport vehicle (1) separated from the transport vehicle group (A) and a new article (W) is loaded onto the same on the return line (L2) (for example, refer to Patent Document 4.).

According to one wafer transport device that transports silicon wafers on a semiconductor production line, a liquid drive source (6) induces a flow of pure water (4) in a constant direction in a fluid path (5) as a circulation flow path, a float (3) carrying a wafer carrier (2) storing silicon wafers (1, 1, . . . ) and floating on the pure water (4) is moved by the flow along the fluid path (5), the float (3) is stopped by float stoppers (7a and 7b) in the vicinity of manufacturing devices (9a and 9b), and the wafer carrier (2) is transferred from the float (3) to the manufacturing devices (9a and 9b) and is transferred from the manufacturing devices (9a and 9b) to the float (3) by manipulators (8a and 8b) (for example, refer to Patent Document 5).

CITATION LIST

Patent Literatures

Patent Document 1: JP-A No. 2006-117079
Patent Document 2: JP-A No. H08-282481
Patent Document 3: JP-A No. 2007-112605
Patent Document 4: JP-A No. 2013-107731
Patent Document 5: JP-A No. 863-102238

SUMMARY OF INVENTION

Technical Problem

The transport device as described in Patent Document 1 is configured to decouple the transport vehicle and transport the same at a high speed by the high-speed drive means on the line other than the straight work line (return line), and no work floor (work plane) on which the worker rides to perform work can be formed on the line other than the straight work line, thereby leading to degradation in work efficiency and space efficiency.

The transport device as described in Patent Document 2 is configured to drive the entire train-like endless continuous body by the feed unit, and it is thus necessary to stop the entire endless continuous body to load and unload the articles on and from the transport vehicles with degradation in work efficiency.

The transport device as described in Patent Document 3 is configured in the free flow system in which the preceding and following transport vehicles are not coupled but the following transport vehicle pushes the preceding transport vehicle, and a gap may be produced between the preceding and following transport vehicles. Accordingly, it is hard to form reliably the continuous work floor (work plane) on which the worker rides.

In contrast to the foregoing devices, according to the transport device as described in Patent Document 4, each of the transport vehicles is composed of one or more vehicle bodies and coupled vehicle bodies that are positioned at the front or back side of the vehicle bodies in the transport direction and are coupled to the vehicle bodies so as to be capable of relative rotation around the vertical axis, and the upper surfaces of the vehicle bodies and the upper surfaces of the coupled vehicle bodies are approximately flush with each other. This makes it possible to form the continuous work floor on which the worker rides to perform parts assembly work, from the upper surfaces of the vehicle body composed of the transport vehicle group by coupling the plurality of transport vehicles via the coupling means and the upper surfaces of the coupled vehicle bodies, and it is also possible to arrange the transport vehicle group in the transport path including the curved path.

Therefore, the worker is allowed to perform the parts assembly work even in the curved path with improvement in work efficiency and space efficiency.

Further, the articles are unloaded from and loaded onto the single transport vehicle separated from the transport vehicle group on the return line. This eliminates the need to stop the transport vehicle group on the work line at the time of loading and unloading of the articles, and allows the worker to perform work while the transport vehicle group is transported at a constant speed on the work line with further improvement in work efficiency.

Moreover, the preceding and following transport vehicles in the transport vehicle group are coupled by the coupling means on the work line and no gap is produced between the preceding and following transport vehicles even with fluctuation in the transport speed. This makes it possible to form reliably the continuous work floor (work plane) on which the worker rides.

The transport device as described in Patent Document 4 has the foregoing features. However, the transport device is configured to include the transport vehicle group formed by coupling the plurality of transport vehicles via the coupling means and the large work floor on the transport vehicle group. Accordingly, the weight of the transport vehicle group becomes heavier to increase running resistance, and it is necessary to add large thrust at the time of driving by the drive unit.

Therefore, the drive unit needs to be large in capacity, which causes the problem of increased energy consumption.

Further, to drive the transport vehicle group by a friction-type drive unit, for example, it is necessary to press a friction roller strongly against the friction surface of the transport vehicle. Accordingly, the frame of the transport vehicle needs to be enhanced in strength with increase in manufacturing costs and the rubber of the friction roller surface may be deteriorated at earlier stages by breakage, deformation, or separation.

The foregoing problems also exist in the transport devices as described in Patent Documents 1 to 3.

The transport device as described in Patent Document 5 is configured to transport the float by the flow of pure water in the water way induced by the liquid drive source in the constant direction. Accordingly, the drive system includes a few sliding parts, and therefore dust is unlikely generated at the drive system and the wafer is not contaminated even if the pure water is scattered. This improves the yield of the semiconductor production line.

However, when the float is transported by the water flow, it is difficult to keep constant the transport speed. Accordingly, this configuration cannot be applied to the work line on which the worker performs work while the transport vehicle group constituting the work floor is transported at a constant speed.

Further, to transport an article long in the transport direction (travelling direction), it is necessary to lengthen the float in the transport direction and increase the curvature radius of the curved path (corner) with limitation on the layout of the water way.

In view of the foregoing circumstances, an object of the present invention is to provide a transport device that transports non-self-propelled transport vehicles carrying articles along a transport path including a curved path and forms a continuous floor on the transport vehicles in the entire or partial transport path. The transport device can suppress increase in running resistance due to rise in weight of the transport vehicle group and suppress increase in energy consumption and manufacturing costs, thereby to prevent earlier-stage degradation of the rubber of the friction roller surface due to breakage, deformation, or separation at the time of driving by the friction-type drive unit.

Solution to Problem

To solve the foregoing problems, a transport device according to the present invention transports a non-self-propelled transport vehicle carrying an article along a transport path including a curved path and forms a continuous floor on the transport vehicle in the entire or partial transport path. The transport device includes: running rails that are laid along the transport path to support running wheels of the transport vehicle; guide rails that guide the transport vehicle along the transport path; a drive unit that drives the transport vehicle; and a water way that is formed along the transport path to reserve water, wherein the transport vehicle is formed such that a plurality of frame bodies with upper surfaces approximately flush with each other is coupled together so as to be bendable relatively in the horizontal direction, and a float body partially or entirely immersed in the water reserved in the water way is fixed to a lower part of each or any of the frame bodies (Claim 1).

According to this configuration, the transport vehicle is formed by coupling the plurality of frame bodies so as to be bendable relatively in the horizontal direction and the float body is fixed to the lower part of each or any of the frame bodies. The plurality of frame bodies bend in the horizontal direction along the curved path and the float body fixed to the lower part of the frame body moves in the water way along the curved path.

Therefore, even when an article longer in the transport direction is to be transported, it is not necessary to increase the curvature radius of the curved path, without limitation on the layout of the transport path (water way) including the curved path.

Further, the transport vehicle is formed by coupling the plurality of frame bodies with the upper surfaces approximately flush with each other so as to be bendable relatively in the horizontal direction. Accordingly, the worker can ride on the upper surface of the vehicle to perform work even in the curved path, with improvement in work efficiency and space efficiency.

Furthermore, the transport vehicle is driven by the drive unit, which allows the transport vehicle to be transported at a constant speed. This achieves formation of the work line on which the worker can perform work while the transport vehicle forming the continuous floor is transported at a constant speed.

Moreover, although the formation of the continuous floor leads to increase in the weight of the vehicle, the float body is fixed to the lower part of each or any of the frame bodies and is immersed in the water reserved in the water way. Accordingly, the load of the vehicle on the running rails becomes smaller due to the buoyancy of the float body.

Therefore, the running resistance between the running wheels of the vehicle and the running rails is reduced to decrease thrust necessary for driving the vehicle. This results in reduction of energy consumption.

It is preferred that the transport vehicle include a friction surface, and the drive unit driving the transport vehicle is a friction-type drive unit including a friction roller to be in abutment with the friction surface (Claim 2).

According to this configuration, it is possible to reduce the load of the vehicle acting on the running rails due to the buoyancy of the float body and decrease thrust necessary for driving the vehicle as described above. Thus, even though the transport vehicle includes the friction surfaces and the drive unit driving the transport vehicle is a friction-type drive unit including a friction roller to be in abutment with the friction surfaces, it is possible to make the pressing force of the friction roller relatively small. This causes no increase in manufacturing costs for improving the strength of the frame bodies for the transport vehicle or no earlier-stage degradation of the rubber of the friction roller surface due to breakage, deformation, or separation during driving by the friction-type drive unit.

It is preferred that a guided member drooping from an article support base supporting the article is supported in an ascendible and descendible manner by a guiding member provided at one of the frame bodies, and the float body partially or entirely immersed in the water reserved in the water way is fixed to the guided member positioned under the guiding member (Claim 3).

According to this configuration, the guided member drooping from the article support base is supported in an ascendible and descendible manner by the guiding member and the float body is fixed to the guided member. Thus, in the state in which the article support base does not support the article, the guided member and the article support base ascend due to the buoyancy of the float body, and the load of the article support base does not act on the transport vehicle.

Further, in the state in which the article support base supports the article, the article support base, the guided member, and the float body descend due to the load of the article, the float body is more immersed in the water with increased buoyancy, and thus the force acting on the transport vehicle due to the load of the article, the article support base, and the guided member becomes smaller.

Therefore, it is possible to lessen the strength of the vehicle and decrease the running resistance between the running wheels of the vehicle and the running rails, thereby reducing thrust necessary for driving the vehicle with lower energy consumption.

It is preferred that the transport device includes a height holding means that, in the state in which the article support base supports the article, holds the height of the article support base relative to the frame bodies at a constant value (Claim 4).

According to this configuration, in the state in which the article support base supports the article, the article support base, the guided member, and the float body descend due to the load of the article, and the float body is more immersed in the water with increased buoyancy. The height holding means holds the height of the article support base relative to the frame bodies at a constant value while the buoyancy is about to match with the load of the article, the article support base, the guided member, and the float body.

Therefore, it is possible to suppress the load of the article, the article support base, the guided member, and the float body acting on the transport vehicle and reduce the running resistance between the running wheels of the vehicle and the running rails. In addition, when the worker rides on the continuous floor to perform work, the height of the article is uniform relative to the floor. Accordingly, there is no deterioration in workability even if the water in the water way ruffles and shakes the float body in the vertical direction.

It is preferred that a work line is configured such that a plurality of the transport vehicles is coupled together by a coupling means to form a transport vehicle group and the transport vehicle group is arranged in the transport path including the curved path, and the worker rides on an upper surface of the transport vehicle group as a work floor to perform work while the transport vehicle group is transported at a constant speed, a return line is provided such that the transport vehicle at the front end of the transport vehicle group in the transport direction is separated and transported at a high speed and is coupled to the back end of the transport vehicle group, and, on the return line, the article is unloaded from the single transport vehicle separated from the transport vehicle group and a new article is loaded onto the same (Claim 5).

According to this configuration, the plurality of transport vehicles can be coupled together by the coupling means to form the transport vehicle group, and the worker can perform work on the upper surface of the transport vehicle group as the work floor, and the worker can unload and load the articles from and onto the transport vehicle separated from the front end of the transport vehicle group in the transport direction. This eliminates the need to stop the transport vehicle group on the work line for unloading and loading the articles with increased work efficiency.

It is preferred that a section between the pair of frame bodies adjacent to each other at the front and back sides of the transport direction is formed in an arc-shaped convex portion at one side and in an arc-shaped concave portion at the other side in a plane view, the curvature radiuses of the arc-shaped convex portion and the arc-shaped concave portion are approximately identical, and the center of rotation around which the pair of frame bodies bends relatively in the horizontal direction is approximately identical to the centers of curvatures of the arc-shaped convex portion and the arc-shaped concave portion (Claim 6).

According to this configuration, the space between the pair of frame bodies adjacent to each other at the front and back sides of the transport direction is formed in the arc-shaped convex portion at one side and in the arc-shaped concave portion at the other side in a plane view, the curvature radiuses of the arc-shaped convex portion and the arc-shaped concave portion are approximately identical, and the center of rotation around which the pair of frame bodies bends relatively in the horizontal direction is approximately identical to the centers of curvatures of the arc-shaped convex portion and the arc-shaped concave portion. Accordingly, the gap between the pair of frame bodies adjacent to each other at the front and back sides of the transport direction is smaller and is not widened even when the pair of frame bodies bends relatively in the horizontal direction.

It is preferred that one of the front end and the back end of the transport vehicle is set as the arc-shaped convex portion and the other is set as the arc-shaped concave portion, the coupling means coupling the transport vehicles positioned at the front and back sides of the transport direction is composed of an arc-shaped guide groove formed in the arc-shaped convex portion at the coupling side of the transport vehicle positioned at the front and back sides of the transport direction and an engagement body for engagement with the arc-shaped guide groove provided at the arc-shaped concave portion at the coupling side of the same such that they are engageable with each other into a coupled state and are disengageable from each other into a decoupled state, and the center of curvature of the arc-shaped guide groove is approximately identical to the center of curvature of the arc-shaped convex portion (Claim 7).

It is also preferred that one of the front end and the back end of the transport vehicle is set as the arc-shaped convex portion and the other is set as the arc-shaped concave portion, the coupling means coupling the transport vehicles positioned at the front and back sides of the transport direction is composed of an arc-shaped guide groove formed in the arc-shaped concave portion at the coupling side of the transport vehicle positioned at the front and back sides of the transport direction and an engagement body for engagement with the arc-shaped guide groove provided at the arc-shaped convex portion at the coupling side of the same such that they are engageable with each other into a coupled state and are disengageable from each other into a decoupled state, and the center of curvature of the arc-shaped guide groove is approximately identical to the center of curvature of the arc-shaped concave portion (Claim 8).

According to these configurations, one of the front end and the back end of the transport vehicle is set as the arc-shaped convex portion and the other is set as the arc-shaped concave portion, a coupling means coupling the transport vehicles positioned at the front and back sides of the transport direction is composed of an arc-shaped guide groove formed in the arc-shaped convex portion (concave portion) at the coupling side of the transport vehicle positioned at the front and back sides of the transport direction and an engagement body for engagement with the arc-shaped guide groove provided at the arc-shaped concave portion (convex portion) at the coupling side of the same such that they are engageable with each other into a coupled state and are disengageable from each other into a decoupled state, and the center of curvature of the arc-shaped guide groove is approximately identical to the center of curvature of the arc-shaped convex portion (concave portion). Accordingly, in the coupled state in which the transport vehicles positioned at the front and back sides of the transport direction are coupled together by the coupling means, the gap between the transport vehicles is small and is not widened even when the front and back transport vehicles bend relatively in the horizontal direction.

Therefore, the continuous floor can be obtained with little gap even in the curved path, which improves workability and causes no risk that the worker has their legs caught in the gap.

In addition, the front and back transport vehicles are coupled together by the coupling means, and no gap is produced between the front and back transport vehicles even with variations in the transport speed and the like. Accordingly, it is possible to form reliably the continuous work floor on which the worker rides.

Further, the coupling means is composed of the arc-shaped guide groove and the engagement body, and the center of curvature of the arc-shaped guide groove and the center of curvature of the arc-shaped convex portion (concave portion) are approximately identical. Accordingly, the coupling means is easy to fabricate, and the simply-structured coupling means can bring the transport vehicles into the coupled state and the decoupled state in a stable and reliable manner.

It is preferred that the transport device includes a water flow generation unit that generates a forward water flow in the transport direction in the water reserved in the water way to apply thrust to the transport vehicle via the float body in the transport direction (Claim 9).

According to this configuration, the water flow generation unit applies thrust to the transport vehicles via the float bodies and the transport vehicles are driven by the thrust, which reduces the drive force of the drive unit necessary for driving the transport vehicles.

Advantageous Effects of Invention

As described above, according to the transport device in the present invention, the following significant advantages can be produced:

(A) Even when an article long in the transport direction is to be transported, it is not necessary to increase the curvature radius of the curved path, and there is no limitation on the layout of the transport path (water way) including the curved path.

(B) The worker can ride on the upper surface of the vehicle to perform work even in the curved path with improvement in work efficiency and space efficiency.

(C) The transport vehicles can be transported at a constant speed, and it is possible to form a work line such that the worker performs work while the transport vehicles constituting the continuous floor are transported at a constant speed.

(D) The running resistance between the running wheels of the vehicle and the running rails can be reduced to decrease thrust necessary for driving the vehicle and cut energy consumption. In addition, even though the drive unit driving the transport vehicle is a friction-type drive unit, there is no increase in manufacturing costs for improving the strength of the frame bodies for the transport vehicle or no earlier-stage degradation of the rubber of the friction roller surface due to breakage, deformation, or separation.

(E) The continuous work floor with little gap can be obtained even in the curved path to improve workability and cause no risk that the worker has their legs caught in the gap.

BRIEF DESCRIPTION OF THE DRAWINGS

FIG. 7(a) illustrates the state in which the following vehicle approaches the preceding vehicle and an inclined surface of a coupling frame of the following vehicle is in abutment with a lift roller of the preceding vehicle, FIG. 7(b) illustrates the state in which the following vehicle further approaches the preceding vehicle and the coupling frame is lifted and swung upward by the lift roller, FIG. 7(c) illustrates the state in which the following vehicle further approaches the preceding vehicle and the coupling frame is swung more upward, and FIG. 7(d) illustrates the coupling complete state in which the following vehicle further approaches the preceding vehicle, the coupling frame is swung downward, and the lift roller enters in an arc-shaped guide groove;

FIG. 11(a) illustrates the state in which the following vehicle approaches the preceding vehicle, FIG. 11(b) illustrates the state in which the following vehicle further approaches the preceding vehicle and a coupling frame is lifted and swung upward by a lift roller, and FIG. 11(c) illustrates the coupling complete state in which the following vehicle further approaches the preceding vehicle, the coupling frame is swung downward, and the lift roller enters in an arc-shaped guide groove; and FIG. 12 is a vertical front view describing the operation of decoupling by the coupling means.

DESCRIPTION OF EMBODIMENTS

Figure 1:
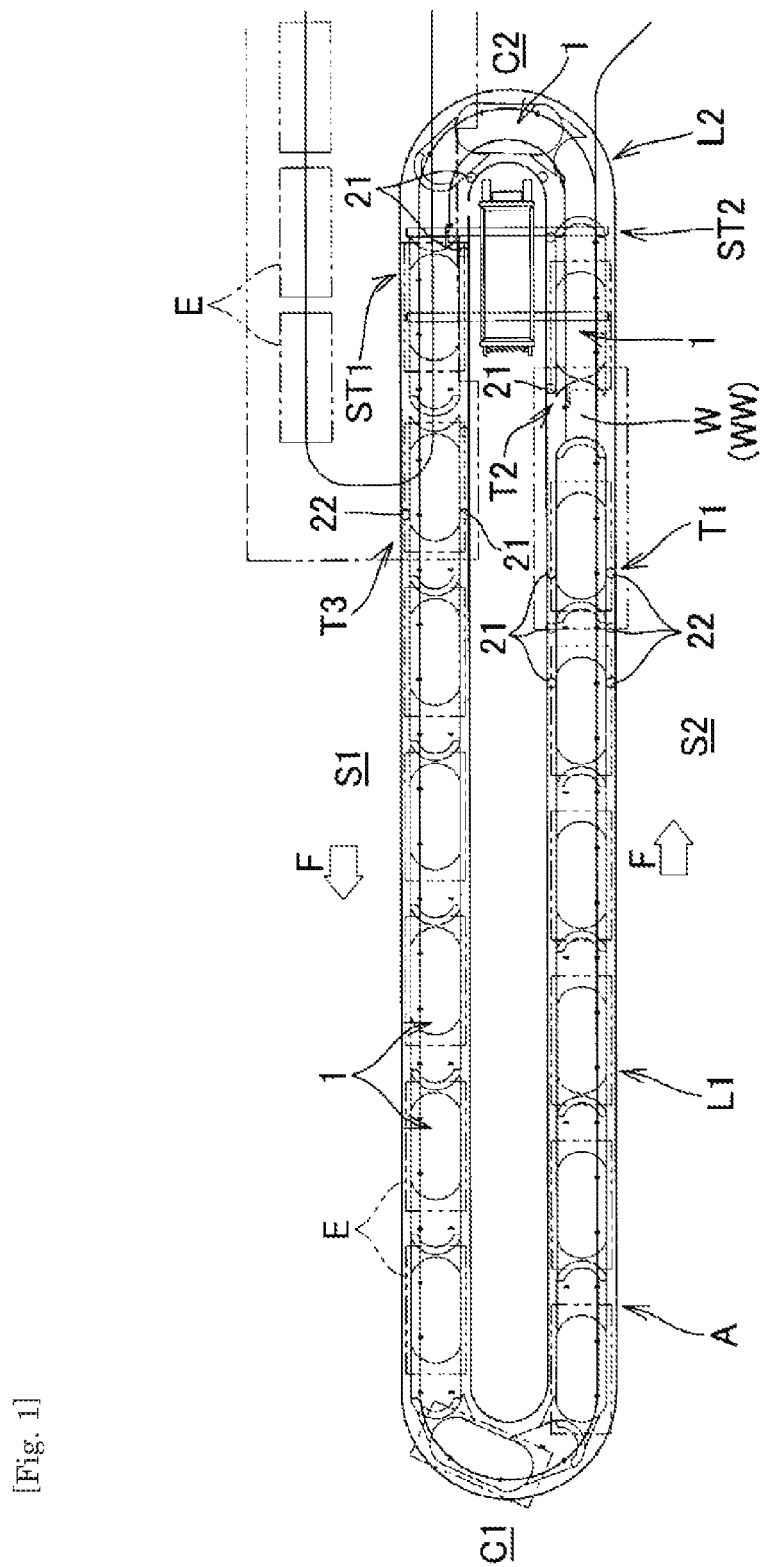
FIG. 1 is a diagram schematically illustrating a layout of a transport device according to an embodiment of the present invention.

Next, embodiments of the present invention will be described in detail with reference to the accompanying drawings. However, the present invention is not limited to the embodiments illustrated in the accompanying drawings and includes all of embodiments satisfying the requirements described in the claims.

The side in the direction of transporting articles (see arrow F in the drawings) will be designated as front side, and the side in the reverse direction as a back side. Views seen from the left side will be designated as front views.

As illustrated in the schematic layout diagram of FIG. 1, a transport device according to an embodiment of the present invention transports non-self-propelled transport vehicles 1, 1, . . . carrying articles E by feed units T1, T2, and T3 as friction roller-type drive units along an endless transport path composed of straight paths S1 and S2 and curved paths C1 and C2.

The transport device arranges a transport vehicle group A formed by coupling front and back transport vehicles 1 and 1 by a coupling means C (see the vertical front views of FIGS. 7a, 7b, 7c and 7d) described later in the transport path including the curved path C1, and has a work line L1 such that a continuous work floor (work plane) B (see the front views of FIGS. 2 and 9) on which the worker rides to perform work is formed on the transport vehicles 1, 1, . . . in part of the transport path. As illustrated in the vertical cross-sectional view as seen from the back side of FIG. 3, the work floor B is flush with a floor surface G.

In addition, a return line L2 is formed by part of the straight path S2, the curved path C2, and part of the straight path S1 such that the transport vehicle 1 at the front end of the transport vehicle group A is separated from the transport vehicle group A, and the separated transport vehicle 1 is transported at a high speed and coupled to the back end of the transport vehicle group A.

Further, the return line L2 includes a loading station ST1 where the articles E are loaded and an unloading station ST2 where the articles E are unloaded. At the unloading station ST2, the articles E are unloaded from the single transport vehicle 1 separated from the transport vehicle group A, and at the loading station ST1, new articles E are loaded onto the empty single transport vehicle 1.

Figure 2:
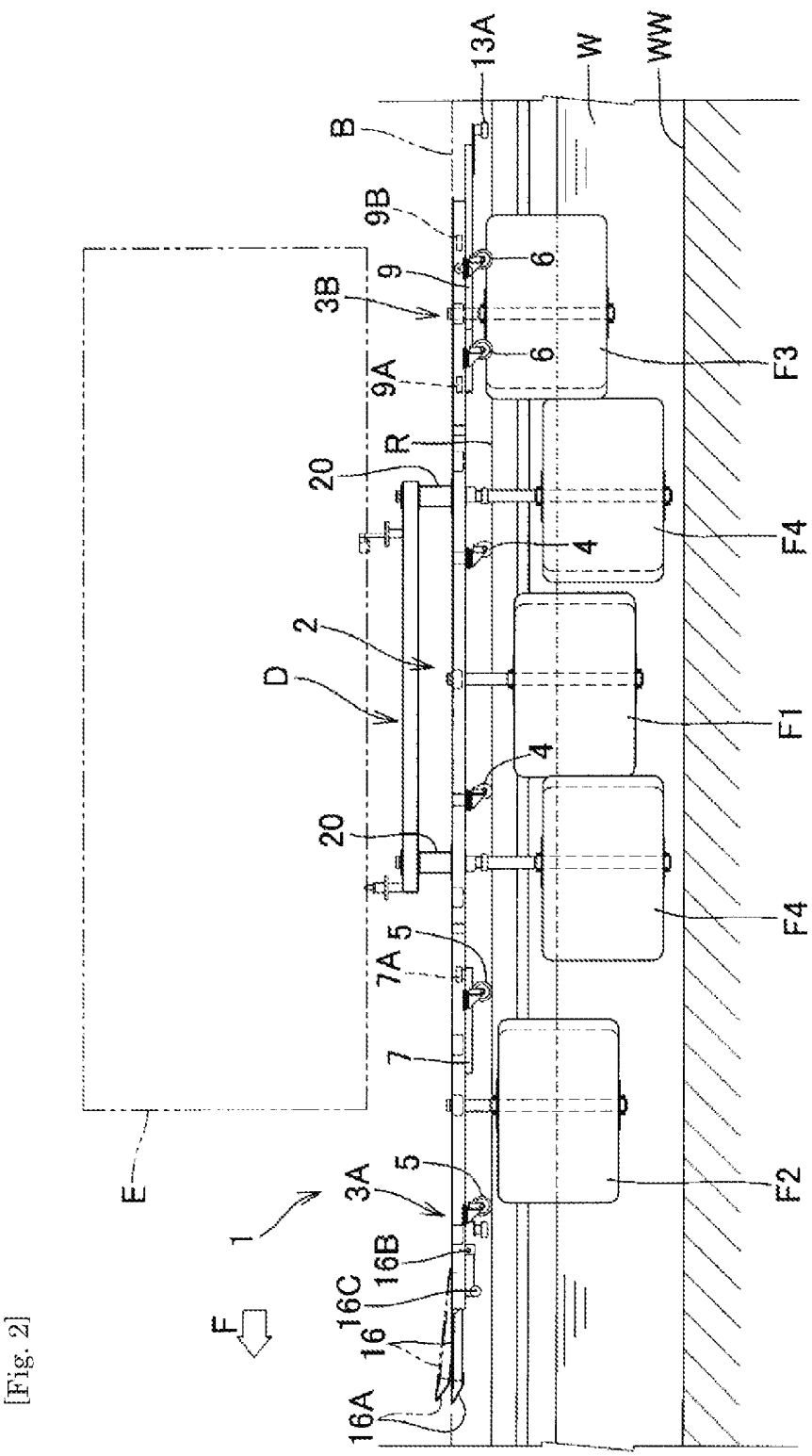
FIG. 2 is a front view of a transport vehicle according to the embodiment of the present invention.

Furthermore, a water way WW reserving water W is provided under the transport vehicles 1 along the transport path. Float bodies F1 to F4 illustrated in the front view of FIG. 2 are immersed in the water W to generate buoyancy acting on the transport vehicles 1.

The transport vehicle group A is transported by a constant-speed transport feed unit T1. Specifically, the transport vehicle 1 at the front end is driven by press-fitting friction rollers 21, . . . of the constant-speed transport feed unit T1 to the side surface of the transport vehicle 1 at the front end (see a driven surface H in FIGS. 3 to 6) while receiving reaction force by backup rollers 22, . . . of the constant-speed transport feed unit T1, thereby to tow the following transport vehicles 1, 1, . . . and transport the transport vehicle group A in an integrated manner at a constant speed.

By bringing a friction roller 21 of the brake feed unit T3 slightly lower in speed than the constant-speed transport feed unit T1 into press-fit with the side surface (driven surface H) of the transport vehicle 1 at the back end of the transport vehicle group A, it is possible to produce the effect that tension force acts on the entire transport vehicle group A to prevent occurrence of rattle among the transport vehicles 1 in the vehicle group A.

Alternatively, the constant-speed transport feed unit T1 may be provided at the back end of the transport vehicle group A to drive the vehicle group A forward, and the brake feed unit T3 may be provided at the front end of the transport vehicle group A.

Further, as described above, the single transport vehicle 1 separated from the transport vehicle group A is transported by the high-speed transport feed unit T2 bringing the friction roller 21 into press-fit with the side surface (driven surface H) of the transport vehicle 1. At the loading station ST1 and the unloading station ST2, the transport vehicle 1 is stopped at a predetermined position to load and unload the articles E.

Furthermore, when the transport vehicle 1 loaded with the new article E at the loading station ST1 is to be transported at a high speed and coupled to the back end of the transport vehicle group A by the high-speed transport feed unit T2, the high-speed transport feed unit T2 is shifted to low-speed operation to decelerate the transport vehicle 1 having been transported at a high speed and couple the same to the back end of the transport vehicle group A by the coupling means C.

In this example, a water flow generation unit as an underwater pump with a discharge port may be provided at an appropriate position in the schematic layout illustrated in FIG. 1 (for example, in the vicinity of the high-speed transport feed unit T2 on the return line L2) so that the water flow generation unit generates a forward water flow to assist the feed units T1, T2, and T3 as drive units.

In the case where the layout of the transport device does not constitute a closed circuit (endless path) as illustrated in FIG. 1, a water flow generation unit generating a water flow by a difference in height may be used instead of the water flow generation unit as an underwater pump.

Figure 3:
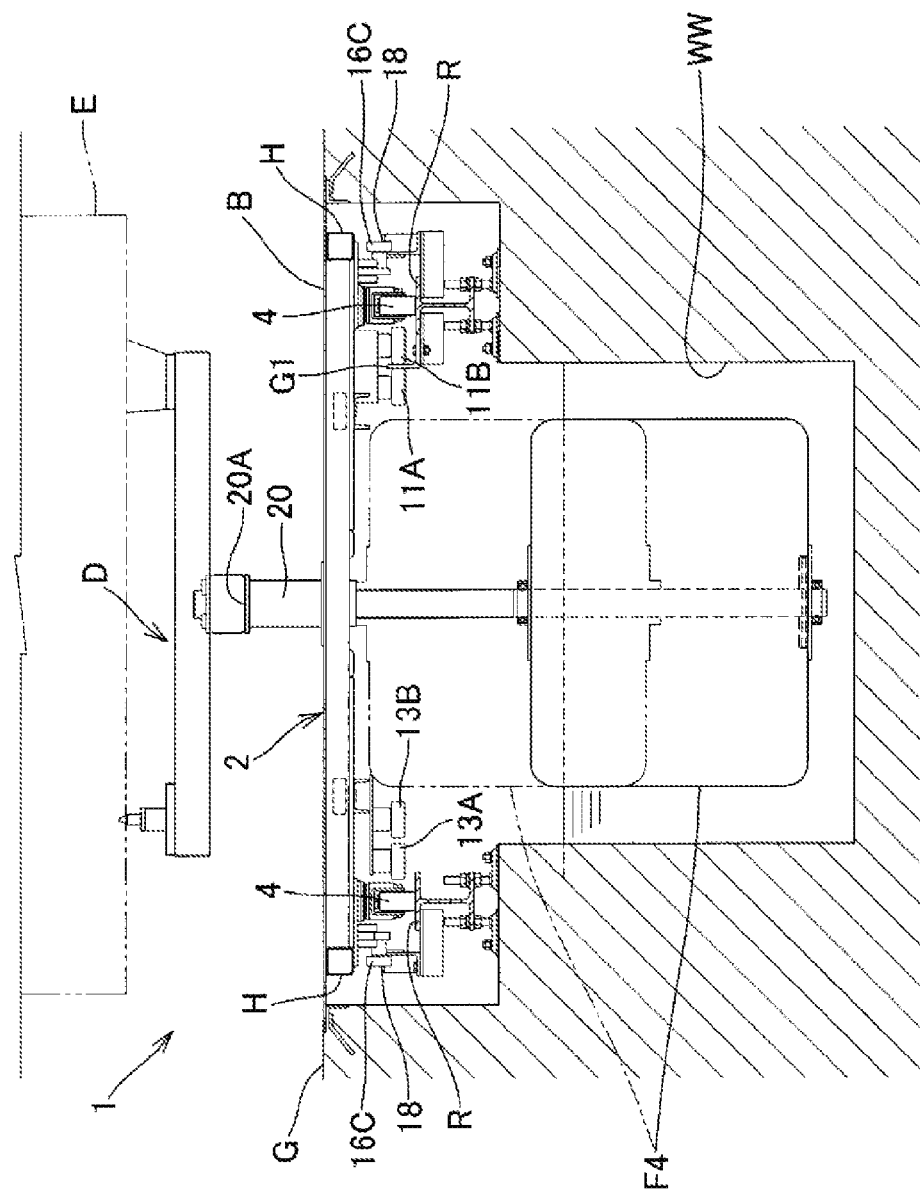
FIG. 3 is a vertical cross-sectional view of the transport vehicle as seen from the back side.
Figure 4:
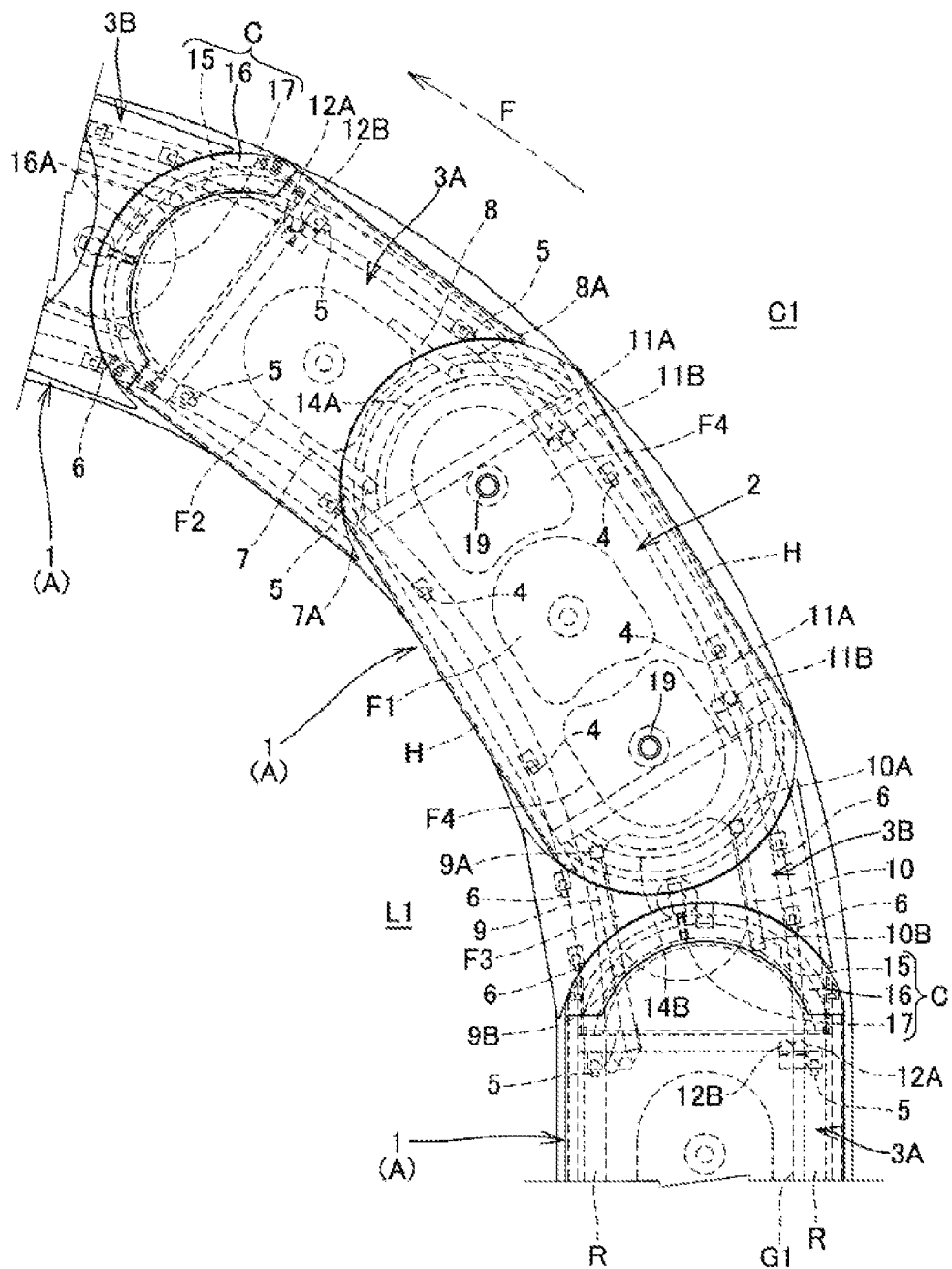
FIG. 4 is a plane view of the transport vehicle in a curved path on a work line.
Figure 5:
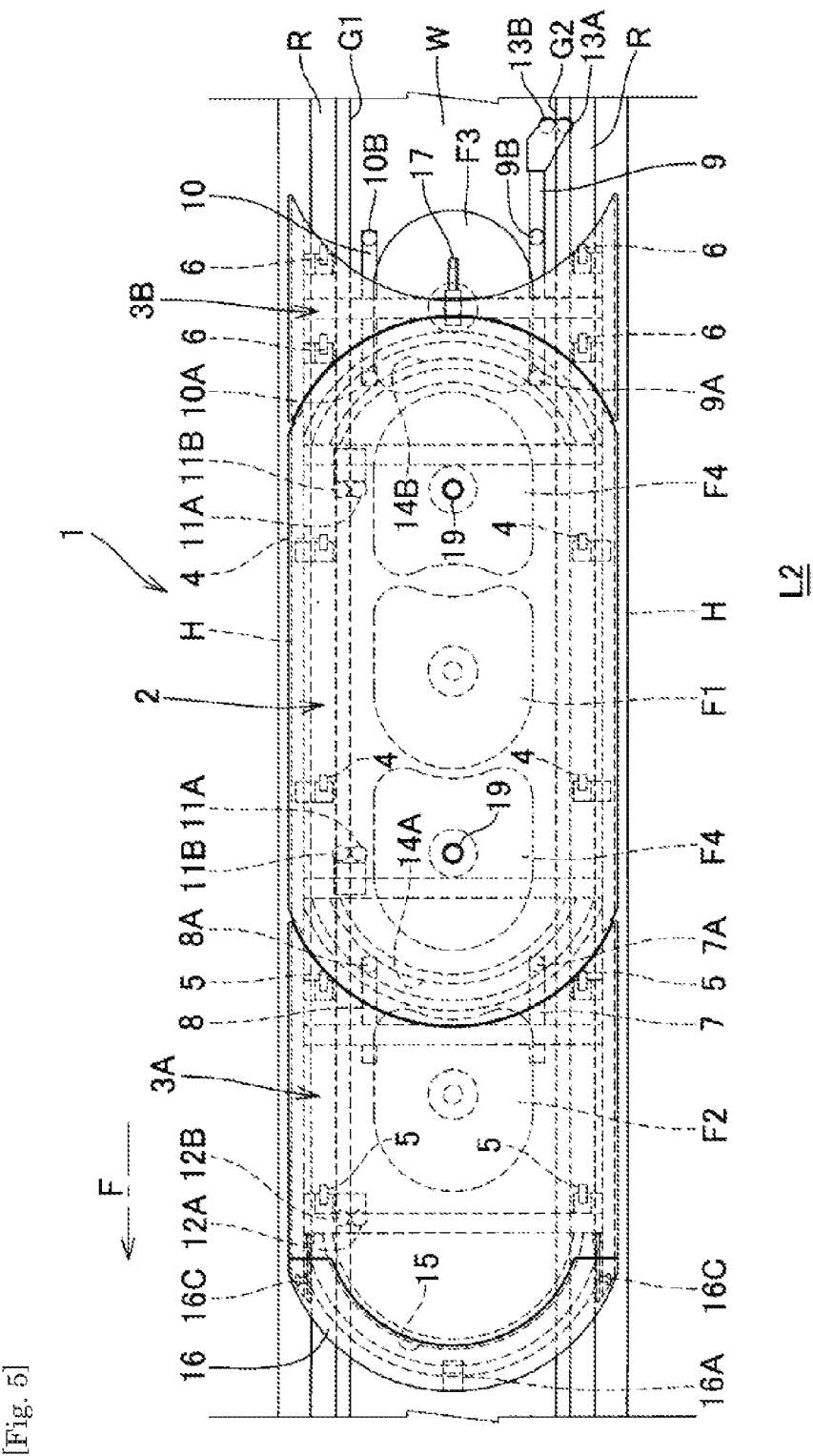
FIG. 5 is a plane view of the transport vehicle in a straight path on a return line.
Figure 6:
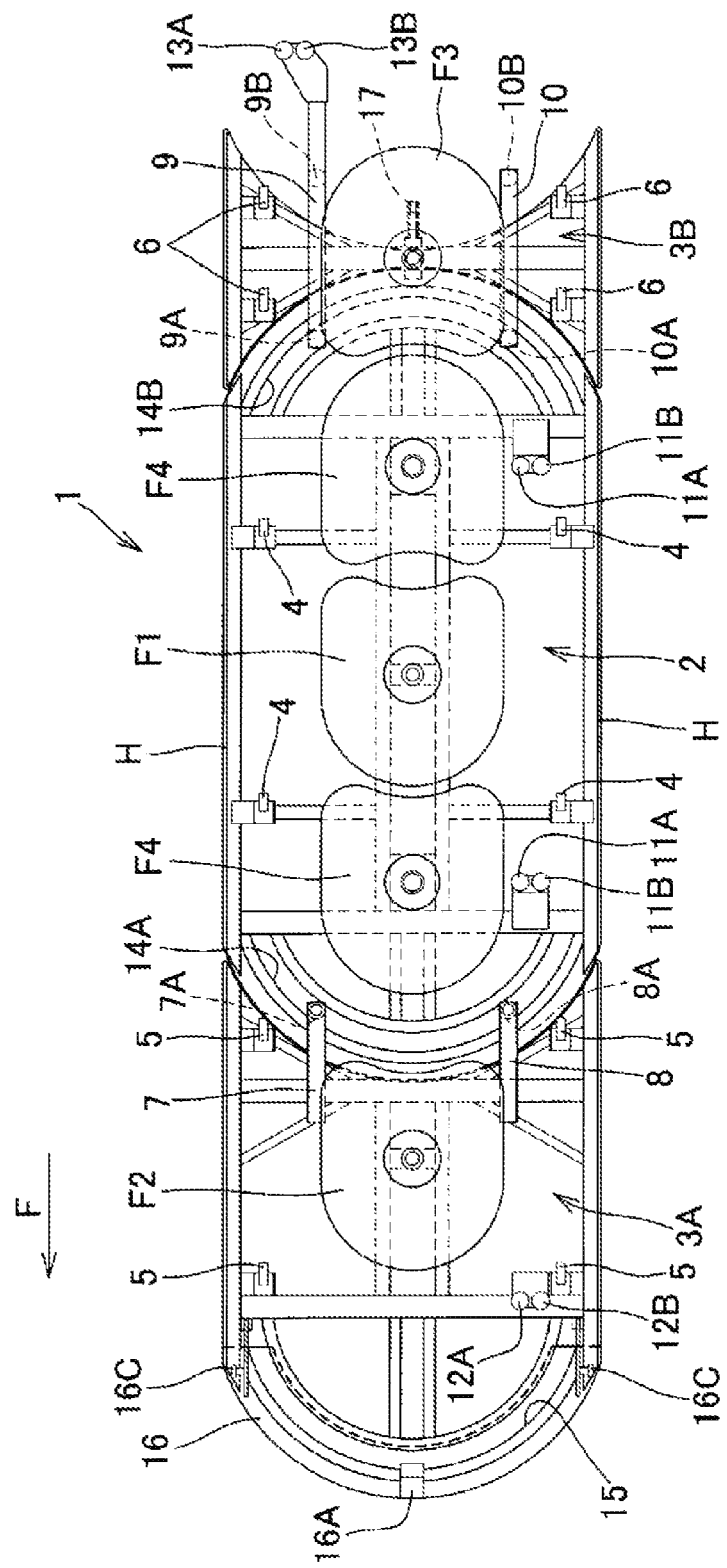
FIG. 6 is a bottom view of the transport vehicle.
Figure 7:
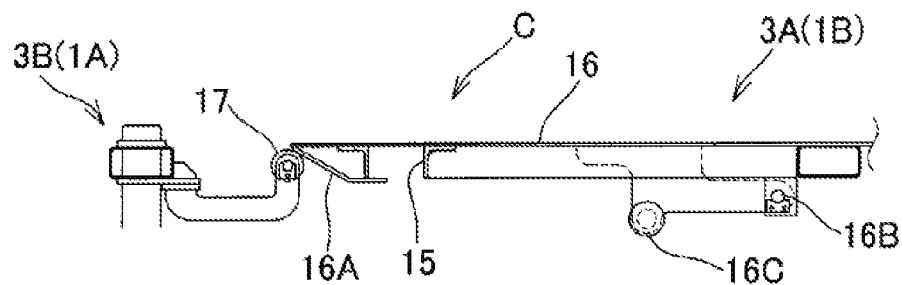
FIG. 7 include vertical front views describing operations of a coupling means that couples a transport vehicle (following vehicle) approaching from the back side to a transport vehicle (preceding vehicle) at the back end of a transport vehicle group.
Figure 7:
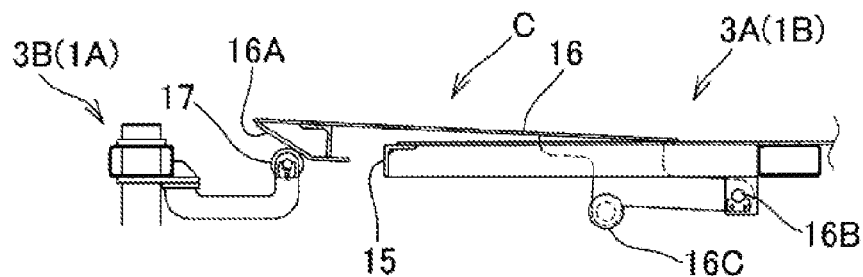
Figure 7:
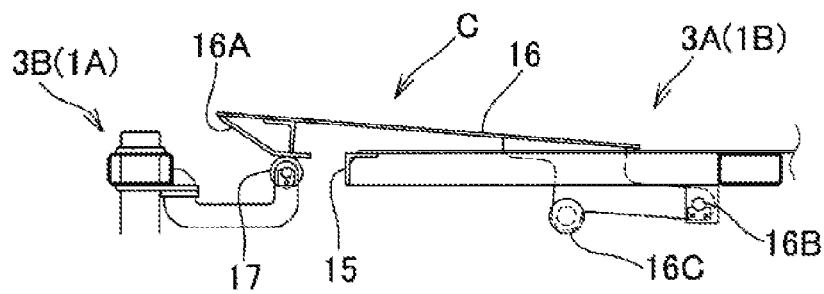
Figure 7:
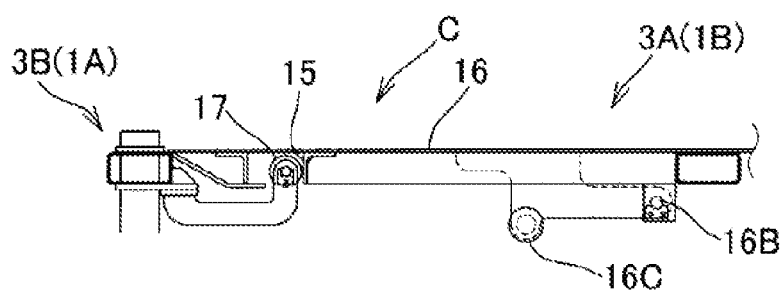

As illustrated in the front view of FIG. 2, the vertical cross-sectional view as seen from the back side of FIG. 3, the plane views of FIGS. 4 and 5, and the bottom view of FIG. 6, the transport vehicle 1 according to the embodiment of the present invention is composed of a vehicle body 2 with an article support base D supporting the article E, a front coupled vehicle body 3A that is positioned at the front side of the vehicle body 2 and is coupled to the vehicle body 2 around a vertical axis so as to be capable of relative rotation, a back coupled vehicle body 3B that is positioned at the back side of the vehicle body 2 and is coupled to the vehicle body 2 around the vertical axis so as to be capable of relative rotation, and others. The upper surface of the vehicle body 2 and the upper surfaces of the front coupled vehicle body 3A and the back coupled vehicle body 3B are approximately flush with each other.

The vehicle body 2 is formed by fixing a frame member to the lower surface of a plate member with straight right and left sides and arc-shaped convex front and back sides (front and back end portions) and attaching running wheels 4, 4, . . . to the front, back, right, and left of the frame body with the horizontal upper surface, such that the running wheels 4, 4, . . . roll on right and left running rails R and R laid along the transport path.

The front coupled vehicle body 3A is formed by fixing a frame member to the lower surface of a plate member with straight right and left sides, an arc-shaped convex front side (front end portion), and an arc-shaped concave back side (back end portion), and attaching running wheels 5, 5, . . . to the front, back, right, and left of the frame body with the horizontal upper surface, such that the running wheels 5, 5, . . . roll on the running rails R and R.

The back coupled vehicle body 3B is formed by fixing a frame member to the lower surface of a plate member with straight right and left sides and arc-shaped concave front and back sides, and attaching running wheels 6, 6, . . . to the front, back, right, and left of the frame body with the horizontal upper surface, such that the running wheels 6, 6, . . . roll on the running rails R and R.

The curvature radiuses of the arc-shaped convex portions and the arc-shaped concave portions are approximately identical.

As illustrated in the plane views of FIGS. 4 and 5 and the bottom view of FIG. 6, coupling rods 7 and 8 long in the front-back direction are fixed to the right and left at the back side of the lower surface of the frame member of the front coupled vehicle body 3A, and they are protruded backward. Coupling rollers (horizontal rollers rotatable around the vertical axis) 7A and 8A as engagement bodies are attached to the upper sides of the back end portions of the coupling rods 7 and 8.

In addition, coupling rods 9 and 10 long in the front-back direction are fixed to the right and left of the lower surface of the frame member of the back coupled vehicle body 3B, and they are protruded forward and backward. Coupling rollers (horizontal rollers rotatable around the vertical axis) 9A and 10A as engagement bodies are attached to the upper sides of the front end portions of the coupling rods 9 and 10. Coupling rollers (horizontal rollers rotatable around the vertical axis) 9B and 10B as engagement bodies are attached to the upper side of the back portion of the coupling rod 9 and the upper side of the back end portion of the coupling rod 10.

The coupling rod 9 is protruded more backward than the coupling rod 10. Guide rollers (horizontal rollers rotatable around the vertical axis) 13A and 13B along a guide rail G2 described later are attached to the lower side of the back end portion of the coupling rod 9.

Arc-shaped guide grooves 14A and 14B are formed on the insides (inner-diameter sides) of the arc-shaped convex portions at the front and back sides of the vehicle body 2, and an arc-shaped guide groove 15 is formed on the inside (inner-diameter side) of the arc-shaped convex portion at the front side of the front coupled vehicle body 3A. The centers of curvatures of the arc-shaped guide grooves 14A, 14B, and 15 are approximately identical to the centers of curvatures of the arc-shaped convex portions.

The coupling rollers 7A and 8A at the back end portions of the coupling rods 7 and 8 of the front coupled vehicle body 3A engage with the arc-shaped guide groove 14A, and the coupling rollers 9A and 10A at the front end portions of the coupling rods 9 and 10 of the back coupled vehicle body 3B engage with the arc-shaped guide groove 14B. In this engagement state, the center of rotation around which the vehicle body 2 and the front coupled vehicle body 3A bend relatively in the horizontal direction becomes approximately identical to the centers of curvatures of the arc-shaped convex portion at the front side of the vehicle body 2 and the arc-shaped concave portion at the back side of the front coupled vehicle body 3A, and the center of rotation around which the vehicle body 2 and the back coupled vehicle body 3B bend relatively in the horizontal direction becomes approximately identical to the centers of curvatures of the arc-shaped convex portion at the back side of the vehicle body 2 and the arc-shaped concave portion at the front side of the back coupled vehicle body 3B.

Therefore, the gap between the vehicle body 2 and the front coupled vehicle body 3A and the gap between the vehicle body 2 and the back coupled vehicle body 3B are small, and the gaps will not be widened even when the vehicle body 2 and the front coupled vehicle body 3A and the vehicle body 2 and the back coupled vehicle body 3B bend relatively in the horizontal direction.

In the state in which the front and back transport vehicles 1, 1, . . . are coupled together as illustrated in FIG. 4, the coupling rollers 9B and 10B at the back portions of the coupling rods 9 and 10 of the back coupled vehicle body 3B of the preceding vehicle engage with the arc-shaped guide groove 15 of the front coupled vehicle body 3A of the following vehicle. In this engagement state, the center of rotation around which the back coupled vehicle body 3B of the preceding vehicle and the front coupled vehicle body 3A of the following vehicle bend relatively in the horizontal direction is approximately identical to the centers of curvatures of the arc-shaped concave portion at the back side of the back coupled vehicle body 3B of the preceding vehicle and the arc-shaped convex portion at the front side of the front coupled vehicle body 3A of the following vehicle.

Therefore, in the state in which the transport vehicles 1 and 1 positioned at the front and back of the transport direction are coupled together by the coupling means C, the gap between the vehicles 1 and 1 is small and will not be widened even when the front and back transport vehicles 1 and 1 bend relatively in the horizontal direction.

Accordingly, the continuous work floor B with little gap can be obtained even in the curved path C1 to improve workability and eliminate the risk that the worker has their legs caught in the gap.

In the foregoing description, the transport vehicle 1 is composed of the vehicle body 2, the front coupled vehicle body 3A, and the back coupled vehicle body 3B, that is, the transport vehicle 1 is formed by coupling the three frame bodies capable of bending relatively in the horizontal direction. However, the transport vehicle 1 in the present invention is merely required to be formed such that a plurality of frame bodies with the upper surfaces approximately flush with each other is coupled together so as to be capable of bending relatively in the horizontal direction.

In the foregoing description, the front side (front end portion) of the transport vehicle 1 is an arc-shaped convex portion and the back side (back end portion) of the same is an arc-shaped concave portion. Alternatively, the front side may be an arc-shaped concave portion and the back side may be an arc-shaped convex portion.

As illustrated in the vertical cross-sectional view as seen from the back side of FIG. 3 and the plane view of FIG. 4, in the transport vehicle group A with the front and back transport vehicles 1 and 1 coupled on the work line L1, guide rollers 11A and 11B provided at the front and back of the right side of the lower surface of the vehicle body 2 and guide rollers 12A and 12B provided at the front of the right side of the lower surface of the front coupled vehicle body 3A sandwich a guide rail G1 laid at the right side of the transport path, and the transport vehicles 1, 1, . . . (transport vehicle group A) are guided by the guide rail G1.

In addition, as illustrated in the plane view of FIG. 5, the guide rollers 11A and 11B provided at the front and back of the right side of the lower surface of the vehicle body 2 and the guide rollers 12A and 12B provided at the front of the right side of the lower surface of the front coupled vehicle body 3A sandwich the guide rail G1, and guide rollers 13A and 13B at the back end portion of the coupling rod 9 of the back coupled vehicle body 3B sandwich the guide rail G2 laid at the left side of the transport path, and therefore the single transport vehicle 1 separated from the transport vehicle group A on the return line L2 is guided by the guide rails G1 and G2.

As illustrated in the front view of FIG. 2 and the plane views of FIGS. 4 and 5, the float body F1 is fixed to the lower part of the frame body of the vehicle body 2, the float body F2 is fixed to the lower part of the frame body of the front coupled vehicle body 3A, and the float body F3 is fixed to the lower part of the frame body of the back coupled vehicle body 3B. The float bodies F1, F2, and F3 are partially or entirely immersed in the water reserved in the water way WW, and the load of the vehicle 1 acting on the running rails R and R becomes smaller due to the buoyancy of the float bodies F1, F2, and F3.

Therefore, the running resistance between the running wheels 4, . . . , 5, . . . , 6, . . . of the vehicles 1 and the running rails R and R is reduced to decrease thrust necessary for driving the vehicle 1 and cut energy consumption.

In this example, the immersed volumes of the float bodies F1, F2, and F3 are changed according to the weights of the frame body of the vehicle body 2, the frame body of the front coupled vehicle body 3A, and the frame body of the back coupled vehicle body 3B to allow the appropriate buoyancy to act according to the weights of the frame bodies. Specifically, the immersed volume of the float body F1 of the heaviest vehicle body 2 is made largest, the immersed volume of the float body F3 of the lightest back coupled vehicle body 3B is made smallest, and the immersed volume of the float body F2 of the front coupled vehicle body 3A heavier than the back coupled vehicle body 3B and lighter than the vehicle body 2 is made larger than the immersed volume of the float body F3 and smaller than the immersed volume of the float body F1.

By adjusting the immersed volumes of the float bodies F1, F2, and F3, the loads of the frame body of the vehicle body 2, the frame body of the front coupled vehicle body 3A, and the frame body of the back coupled vehicle body 3B acting on the running rails R and R can be uniformed. This minimizes the frictional resistance during running of the transport vehicle 1.

Figure 9:
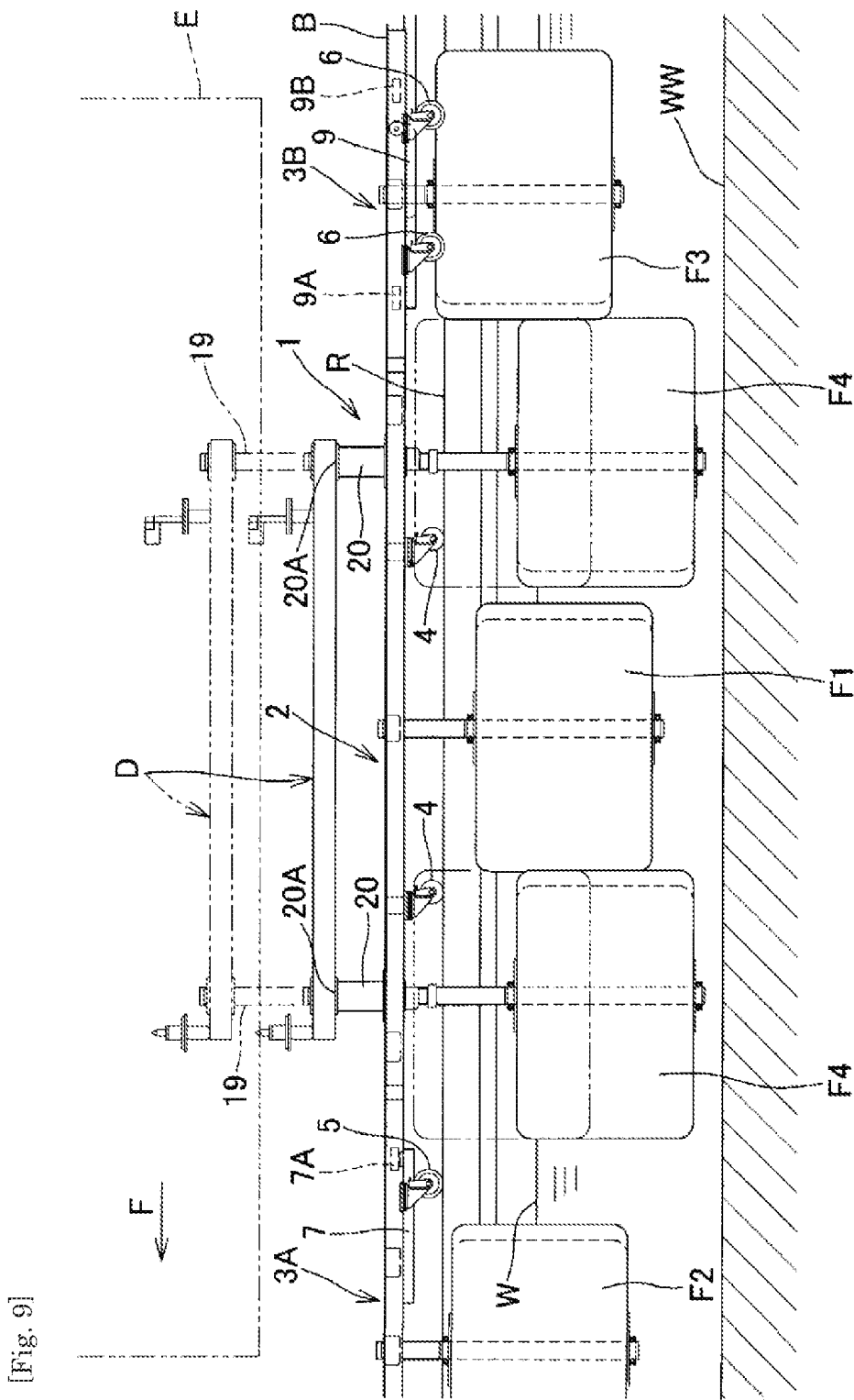
FIG. 9 is a front view of a configuration example of a height holding means.

As illustrated in the front view of FIG. 2, the vertical cross-sectional view as seen from the back side of FIG. 3, the plane views of FIGS. 4 and 5, and the front view of FIG. 9, front and back rods 19 and 19 as guided members drooping from the article support base D supporting the article E are supported in an ascendible and descendible manner by front and back guiding members 20 and 20 provided at the frame body of the vehicle body 2. Float bodies F4 and F4 partially or entirely immersed in the water W reserved in the water way WW are fixed to the rods 19 and 19 under the guiding members 20 and 20.

Therefore, in the state in which the article support base D does not support the article E (shown by virtual lines in FIG. 9), the rods 19 and 19 and the article support base D are raised by the buoyancy of the float bodies F4 and F4 and the load of the article support base D does not act on the vehicle body 2 (transport vehicle 1).

In the state in which the article support base D supports the article E (shown by solid lines in FIG. 9), the article support base D, the rods 19 and 19, and the float bodies F4 and F4 are lowered under the load of the article E and the immersed amounts of the float bodies F4 and F4 increase to enhance the buoyancy and decrease the force acting on the vehicle body 2 (transport vehicle 1) under the loads of the article E, the article support base D, and the rods 19 and 19.

Therefore, it is possible to lessen the strength of the vehicle 1 and decrease the running resistance between the running wheels 4, . . . , 5, . . . , 6, . . . of the vehicle 1 and the running rails R and R, thereby reducing thrust necessary for driving the vehicle 1 with lower energy consumption.

Further, in the state in which the article support base D supports the article E (shown by the solid lines in FIG. 9), the lower surface of the article support base D is in abutment with upper surfaces 20A and 20A of the guiding members 20 and 20 and the height of the article support base D (article E) is held at a constant value relative to the transport vehicle 1 while the buoyancy of the float bodies F4 and F4 is about to match the loads of the article E, the article support base D, the rods 19 and 19, and the float bodies F4 and F4.

By providing the height holding means that, in the state in which the article support base D supports the article E, holds the height of the article support base D (article E) at a constant value relative to the transport vehicle 1 (the frame bodies), the height of the article E is made constant relative to the work floor B on which the worker rides to perform work. Accordingly, there is no degradation in workability even when the water W in the water way WW ripples to shake the float bodies F4 and F4 in the vertical direction.

The height holding means is not limited to the configuration in which the upper surfaces 20A and 20A of the guiding members 20 and 20 illustrated in FIG. 9 bring into abutment with the lower surface of the article support base D to determine the lowest position of the article support base D. Alternatively, the article support base D may be provided with guide rollers such that the guide rollers are brought into contact with the guide rails laid on the ground to hold the height of the article support base D (article E) at a constant value.

Next, a configuration example of the coupling means C will be described mainly with reference to the vertical front views for describing operation of FIGS. 7a, 7b, 7c and 7d.

As illustrated in FIGS. 2, 5, 7a, 7b, 7c and 7d, a coupling frame 16 is attached to the front end portion of the front coupled vehicle body 3A so as to be capable of swinging upward around a swinging shaft 16B, and an inclined plane 16A is formed on the lower surface at the front end edge of the coupling frame 16.

In addition, as illustrated in FIGS. 5, 7a, 7b, 7c and 7d, a lift roller 17 is attached to the tip of an arm protruding backward at the center of the back coupled vehicle body 3B in the horizontal direction so as to be capable of rotation around a horizontal axis.

Therefore, as illustrated in FIG. 7(a), in the state in which the following vehicle 1B is close to the preceding vehicle 1A and the inclined plane 16A of the coupling frame 16 of the following vehicle 1B is in abutment with the lift roller 17 of the preceding vehicle 1A, when the following vehicle 1B further approaches the preceding vehicle 1A as illustrated in FIGS. 7(b) and 7(c), the lift roller 17 of the preceding vehicle 1A swings the coupling frame 16 of the following vehicle 1B upward around the swinging shaft 16B.

Then, when the following vehicle 1B further approaches the preceding vehicle 1A as illustrated in FIG. 7(d), the coupling frame 16 of the following vehicle 1B swings downward and the lift roller 17 of the preceding vehicle 1A enters into the arc-shaped guide groove 15. In this state, the coupling rollers 9B and 10B of the preceding vehicle 1A (for example, see FIGS. 4 and 5) engage with the arc-shaped guide groove 15 of the following vehicle 1B (for example, see FIG. 5), and the following vehicle 1B is coupled to the preceding vehicle 1A.

Next, a configuration example for decoupling the front and back vehicles by the coupling means C will be described.

Figure 8:
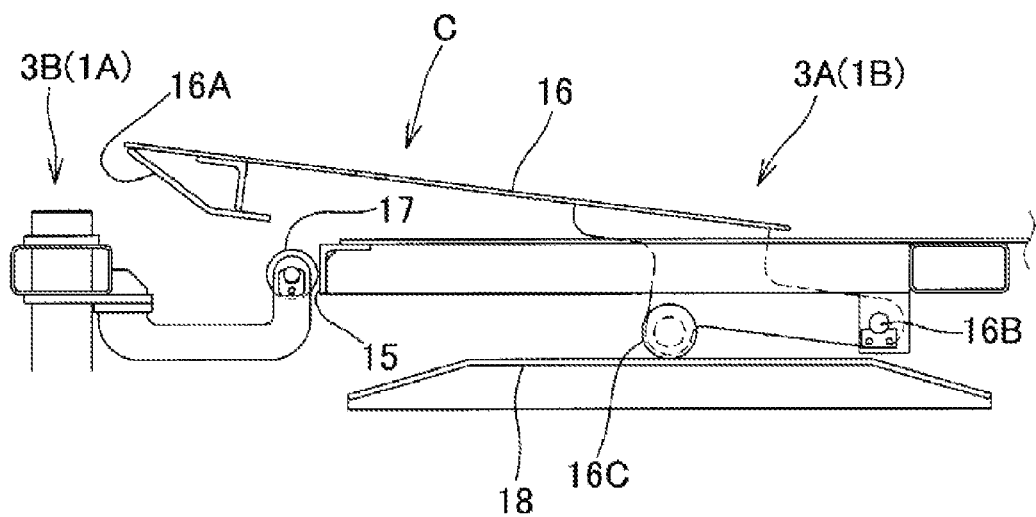
FIG. 8 is a vertical front view describing the operation of decoupling by the coupling means.

As illustrated in the vertical front view of FIG. 8, decoupling cam rails 18 and 18 (also see FIG. 3) provided at predetermined positions lift operated rollers 16C and 16C of the coupling frame 16 of the following vehicle 1B to open the front side of the lift roller 17 and the coupling rollers 9B and 10B of the preceding vehicle 1A (at the front end of the transport vehicle group A in the transport direction), whereby the preceding vehicle 1A is decoupled from the following vehicle 1B.

Accordingly, the preceding vehicle 1A (at the front end of the transport vehicle group A in the transport direction) is driven by the high-speed transport feed unit T2 to transport the preceding vehicle 1A alone.

When the front and back transport vehicles 1 and 1 are coupled by the coupling means C, no gap is produced between the front and back transport vehicles 1 and 1 even with variations in the transport speed and the like, thereby forming reliably the continuous work floor B on which the worker rides.

In addition, the coupling means C is composed of the arc-shaped guide groove 15 and the engagement bodies (coupling rollers 9B and 10B), and the center of curvature of the arc-shaped guide groove 15 is approximately identical to the center of curvature of the arc-shaped convex portion. Accordingly, the coupling means C is easy to fabricate, and the simply-structured coupling means C can bring the transport vehicles into the coupled state and the decoupled state in a stable and reliable manner.

Next, modification examples of the transport vehicle 1 and the coupling means C will be described.

Figure 10:
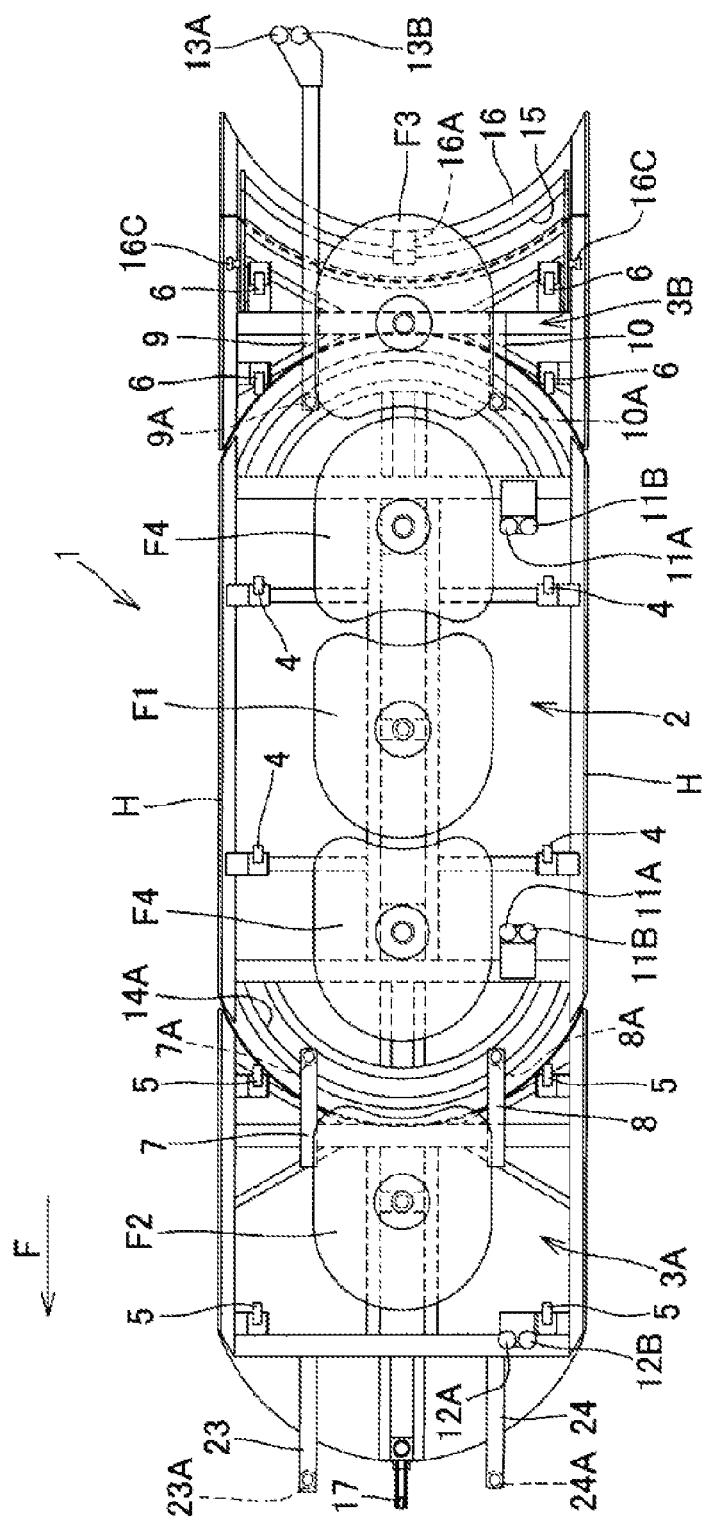
FIG. 10 is a bottom view of a modification example of the transport vehicle.
Figure 11:
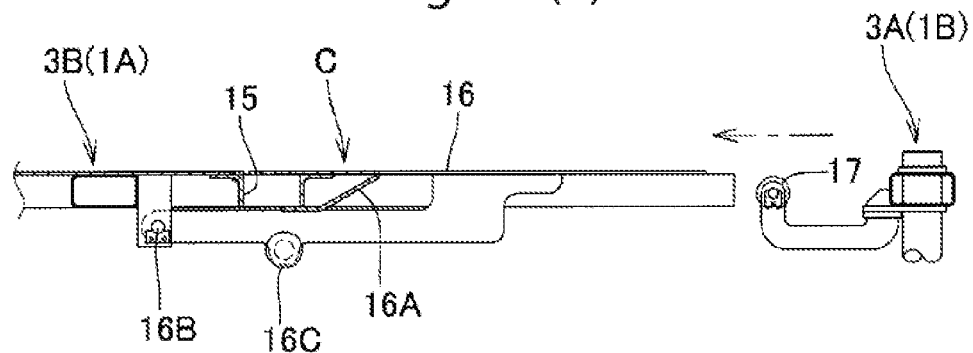
FIG. 11 includes vertical front views for describing operations of a coupling means that couples a transport vehicle (following vehicle) approaching from the back side to a transport vehicle (preceding vehicle) at the back end of a transport vehicle group composed of a modification example of the transport vehicles.
Figure 11:
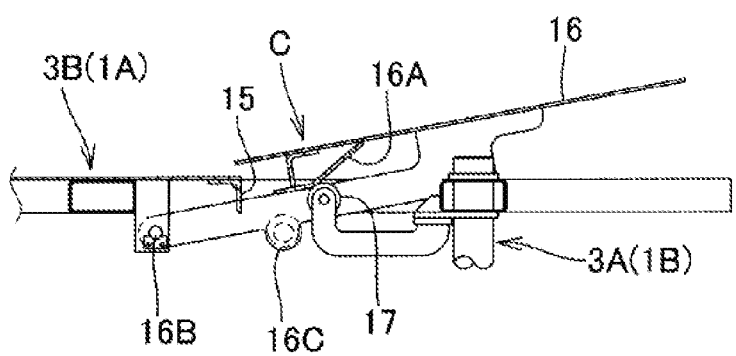
Figure 11:
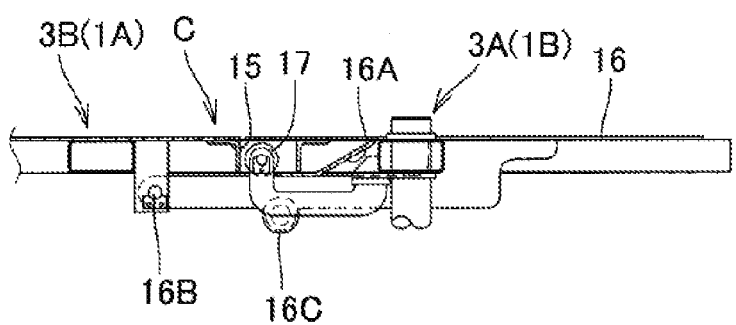

In the bottom view of a modification example of the transport vehicle 1 of FIG. 10, the vertical front view for describing the operation of the coupling means of FIGS. 11a, 11b and 11c, and the vertical front view for describing the operation of decoupling by the coupling means of FIG. 12, the components with the same reference signs as those in FIGS. 1 to 11 are identical or equivalent to the components illustrated in FIGS. 1 to 11.

The modification example of the transport vehicle 1 illustrated in the bottom view of FIG. 10 will be described below as compared to the transport vehicle 1 illustrated in the bottom view of FIG. 6.

In the transport vehicle 1 of FIG. 6, the arc-shaped guide groove 15 is formed at the arc-shaped convex portion at the coupling side (front end portion) of the transport vehicle 1.

In contrast to this, in the transport vehicle 1 of FIG. 10, the arc-shaped guide groove 15 is formed at the arc-shaped concave portion at the coupling side (back end portion) of the transport vehicle 1. In addition, in the transport vehicle 1 of FIG. 10, the center of curvature of the arc-shaped guide groove 15 is approximately identical to the center of curvature of the arc-shaped concave portion at the back end portion.

In the transport vehicle 1 of FIG. 6, the coupling frame 16, the inclined plane 16A, the swinging shaft 16B, and the operated rollers 16C are provided at the front coupled vehicle body 3A, and the lift roller 17 is attached to the tip of the arm protruding backward from the back coupled vehicle body 3B.

In contrast to this, in the transport vehicle 1 of FIG. 10, the coupling frame 16, the inclined plane 16A, the swinging shaft 16B, and the operated rollers 16C are provided at the back coupled vehicle body 3B, and the lift roller 17 is attached to the tip of the arm protruding forward from the front coupled vehicle body 3A.

Further, in the transport vehicle 1 of FIG. 6, the coupling rods 9 and 10 long in the front-back direction are fixed to the back coupled vehicle body 3B and are protruded forward and backward, the coupling rollers 9A and 10A as engagement bodies are attached to the upper sides of the front end portions of the coupling rods 9 and 10, and the coupling rollers 9B and 10B as engagement bodies are attached to the upper side of the back portion of the coupling rod 9 and the upper side of the back end portion of the coupling rod 10.

In contrast to this, in the transport vehicle 1 of FIG. 10, the coupling rods 9 and 10 are fixed to the back coupled vehicle body 3B and are protruded forward, and the coupling rollers 9A and 10A as engagement bodies are attached to the upper sides of the front end portions of the coupling rods 9 and 10, the coupling rods 23 and 24 fixed to the front coupled vehicle body 3A are protruded forward, and the coupling rollers 23A and 24A as engagement bodies are attached to the upper sides of the front end portions of the coupling rods 23 and 24.

Furthermore, in the transport vehicle 1 of FIG. 6, the guide rollers 13A and 13B along the guide rail G2 are attached to the lower side of the back end portion of the coupling rod 9 protruding more backward than the coupling rod 10.

In contrast to this, in the transport vehicle 1 of FIG. 10, the guide rollers 13A and 13B along the guide rail G2 are attached to the lower side of the back end portion of the coupling rod 9 protruding backward, as in the transport vehicle 1 of FIG. 6.

According to the configuration of the transport device as described above, the vehicle body 2, the front coupled vehicle body 3A, and the back coupled vehicle body 3B are coupled together so as to be capable of bending relatively in the horizontal direction to form the transport vehicle 1, and the float bodies F1, F2, and F3 are fixed to the lower parts of the frame bodies of the vehicle body 2, the front coupled vehicle body 3A, and the back coupled vehicle body 3B. Accordingly, the vehicle body 2, the front coupled vehicle body 3A, and the back coupled vehicle body 3B bend in the horizontal direction along the curved paths C1 and C2, and the float bodies F1, F2, and F3 fixed to the lower parts of the vehicle body 2, the front coupled vehicle body 3A, and the back coupled vehicle body 3B move in the water way WW along the curved paths C1 and C2.

Therefore, even in the case of transporting the article E long in the transport direction, it is not necessary to increase the curvature radiuses of the curved paths C1 and C2 with no limitation on the layout of the transport path (water way WW) including the curved paths C1 and C2.

In addition, the vehicle body 2, the front coupled vehicle body 3A, and the back coupled vehicle body 3B with the upper surfaces flush with one another are coupled together so as to be capable of bending relatively in the horizontal direction to form the transport vehicle 1, and the worker can ride on the upper surface of the vehicle to perform work even in the curved path C1 with improved work efficiency and space efficiency.

Further, the load of the vehicle 1 acting on the running rails R and R is lessened by use of the buoyancy of the float bodies F1, F2, F3, and F4 to reduce thrust necessary for driving of the vehicle 1. Accordingly, even when the side surface (or any other surface) of the transport vehicle 1 includes a friction surface H and the drive unit for driving the transport vehicle 1 is a friction-type drive unit including a friction roller 21 to be in abutment with the friction surface H, the pressing force of the friction roller 21 can be made relatively small. Accordingly, there is no increase in manufacturing costs for enhancing the strength of the frame bodies of the transport vehicle 1 or no earlier-stage deterioration of the rubber of the surface of the friction roller 21 due to breakage, deformation, separation, or the like when being driven by the friction-type drive unit.

Furthermore, in the configuration in which the water flow generation unit is provided to generate a forward water flow in the water W reserved in the water way WW and apply thrust to the transport vehicle 1 via the float bodies F1, F2, F3, and F4, the transport vehicle 1 can be driven by the thrust generated from the water flow to reduce the driving force of the feed units T1, T2, and T3 as drive units for driving the transport vehicle 1.

In the foregoing description, the continuous work floor (work plane) B on which the worker rides to perform work is formed on the transport vehicles 1, 1, . . . . However, the transport device in the present invention is also applicable to the transport path dedicated for transport without work processes. In the case of using the transport device in the present invention for the transport path dedicated for transport, not the continuous work floor on which the worker rides to perform work but a continuous floor is formed on the transport vehicles 1, 1, . . . so that the worker or others rides on the continuous floor to traverse the transport path, for example.

In the foregoing description, the work floor B is formed in some parts of the straight paths S1 and S2 and the curved path C1. Alternatively, the work floor B may be formed only in some parts of the straight paths S1 and S2 or may be formed only in some parts of the curved paths C1 and C2.

Further, in the foregoing description, the work floor B is formed in part of the transport path including the curved path C1. Alternatively, the work floor B may be formed in the entire transport path. This case produces the advantage that the worker can ride on the work floor B to perform work in the entire region (entire length) of the transport path. In this case, however, it is not possible to stop the individual vehicle 1 to load and unload the articles E (see the loading station ST1 and the unloading station ST2 illustrated in FIG. 1). Accordingly, the articles E are loaded and unloaded in synchronization with the vehicle 1 moving at a constant speed or the articles E are loaded and unloaded while all the coupled vehicles 1, 1, . . . are stopped concurrently.

REFERENCE SIGNS LIST

A Transport vehicle group
B Continuous work floor
C Coupling means
C1,C2 Curved path
D Article support base
E Article
F Transport direction
F1, F2, F3, and F4 Float body
G Floor surface
G1 and G2 Guide rail
H Driven surface
L1 Work line
L2 Return line
R Running rail
S1,S2 Straight path
ST1 Loading station
ST2 Unloading station
T1 Constant-speed transport feed unit (friction-type drive unit)
T2 High-speed transport feed unit (friction-type drive unit)
T3 Brake feed unit (friction-type drive unit)
W Water
WW Water way
1 Transport vehicle
1A Preceding vehicle
1B Following vehicle
2 Vehicle body (frame body)
3A Front coupled vehicle body (frame body)
3B Back coupled vehicle body (frame body)
4, 5, and 6 Running wheel
7, 8, 9, and 10 Coupling rod
7A, 8A, 9A, 9B, 10A, and 10B Coupling roller (engagement body)
11A, 11B, 12A, 12B, 13A, and 13B Guide roller
14A, 14B, and 15 Arc-shaped guide groove
16 Coupling frame
16A Inclined plane
16B Swinging shaft
16C Operated roller
17 Lift roller
18 Decoupling cam rail
19 Rod (guided member)
20 Guiding member
20A Upper surface (height holding means)
21 Friction roller
22 Backup roller
23 and 24 Coupling rod
23A and 24A Coupling roller

The invention claimed is:
1. A transport device transporting a non-self-propelled transport vehicle carrying an article along a transport path including a curved path and forming a continuous floor on the transport vehicle in the entire or partial transport path, the transport device comprising:
running rails that are laid along the transport path to support running wheels of the transport vehicle;
guide rails that guide the transport vehicle along the transport path;
a drive unit that drives the transport vehicle; and
a water way that is formed along the transport path to reserve water, wherein
the transport vehicle is formed such that a plurality of frame bodies with upper surfaces approximately flush with each other is coupled together so as to be bendable relatively in the horizontal direction, and
a float body partially or entirely immersed in the water reserved in the water way is fixed to a lower part of each or any of the frame bodies.

2. The transport device according to claim 1, wherein
the transport vehicle includes a friction surface, and
the drive unit driving the transport vehicle is a friction-type drive unit including a friction roller to be in abutment with the friction surface.

3. The transport device according to claim 1, wherein
a guided member drooping from an article support base supporting the article is supported in an ascendible and descendible manner by a guiding member provided at one of the frame bodies, and
the float body partially or entirely immersed in the water reserved in the water way is fixed to the guided member positioned under the guiding member.

4. The transport device according to claim 3, comprising a height holding means that, in the state in which the article support base supports the article, holds the height of the article support base relative to the frame bodies at a constant value.

5. The transport device according to claim 1, wherein
a work line is configured such that a plurality of the transport vehicles is coupled together by a coupling means to form a transport vehicle group and the transport vehicle group is arranged in the transport path including the curved path,
a return line is provided such that the transport vehicle at a front end of the transport vehicle group in the transport direction is separated and transported at a high speed and is coupled to a back end of the transport vehicle group, and
on the return line, the article is unloaded from one of the transport vehicles that is separated from the transport vehicle group and a new article is loaded onto the same.

6. The transport device according to claim 1, wherein
a section between a pair of the frame bodies adjacent to each other at the front and back sides of the transport direction is set as an arc-shaped convex portion at one side and as an arc-shaped concave portion at the other side in a plane view,
the curvature radiuses of the arc-shaped convex portion and the arc-shaped concave portion are approximately identical, and
the center of rotation around which the pair of the frame bodies bends relatively in the horizontal direction is approximately identical to the centers of curvatures of the arc-shaped convex portion and the arc-shaped concave portion.

7. The transport device according to claim 6, wherein
one of the front end and the back end of the transport vehicle is set as the arc-shaped convex portion and the other is set as the arc-shaped concave portion,
the coupling means coupling the transport vehicles positioned at the front and back sides of the transport direction is composed of an arc-shaped guide groove formed in the arc-shaped convex portion at the coupling side of the transport vehicle positioned at the front and back sides of the transport direction and an engagement body for engagement with the arc-shaped guide groove provided at the arc-shaped concave portion at the coupling side of the same such that they are engageable with each other into a coupled state and are disengageable from each other into a decoupled state, and
the center of curvature of the arc-shaped guide groove is approximately identical to the center of curvature of the arc-shaped convex portion.

8. The transport device according to claim 6, wherein
one of the front end and the back end of the transport vehicle is set as the arc-shaped convex portion and the other is set as the arc-shaped concave portion,
the coupling means coupling the transport vehicles positioned at the front and back sides of the transport direction is composed of an arc-shaped guide groove formed in the arc-shaped concave portion at the coupling side of the transport vehicle positioned at the front and back sides of the transport direction and an engagement body for engagement with the arc-shaped guide groove provided at the arc-shaped convex portion at the coupling side of the same such that they are engageable with each other into a coupled state and are disengageable from each other into a decoupled state, and
the center of curvature of the arc-shaped guide groove is approximately identical to the center of curvature of the arc-shaped concave portion.

9. The transport device according to claim 1, comprising a water flow generation unit that generates a forward water flow in the transport direction in the water reserved in the water way to apply thrust to the transport vehicle via the float body in the transport direction.

* * * * *